(12) United States Patent
Donoho

(10) Patent No.: US 7,567,220 B1
(45) Date of Patent: Jul. 28, 2009

(54) METHOD OF USING A VIDEO CONFERENCING SYSTEM INCLUDING AT LEAST TWO 2-DIMENSIONAL DISPLAY SCREENS TO IMPLEMENT A COMMON VIRTUAL SURFACE

(75) Inventor: Andrew Ward Donoho, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/182,721

(22) Filed: Jul. 30, 2008

(51) Int. Cl.
G09G 5/00 (2006.01)
(52) U.S. Cl. .......................... 345/1.1; 345/2.2; 345/653
(58) Field of Classification Search .................. 345/1.1, 345/1.3, 2.1, 2.2, 4–6, 649, 650, 653, 654, 345/676, 679, 680; 348/14.01, 14.03, 14.07, 348/14.08; 715/751, 753, 757
See application file for complete search history.

(56) References Cited

U.S. PATENT DOCUMENTS

| | | | |
|---|---|---|---|
| 5,452,414 A | 9/1995 | Rosendahl et al. |
| 5,515,486 A | 5/1996 | Amro et al. |
| 5,588,098 A | 12/1996 | Chen |
| 5,594,471 A | 1/1997 | Deeran et al. |
| 5,896,132 A | 4/1999 | Berstis et al. |
| 5,900,876 A | 5/1999 | Yagita et al. |
| 6,020,887 A | 2/2000 | Loring et al. |
| 6,396,506 B1 | 5/2002 | Hoshino et al. |
| 7,007,242 B2 | 2/2006 | Suomela et al. |
| 7,027,659 B1 | 4/2006 | Thomas |
| 7,227,567 B1 | 6/2007 | Beck et al. |
| 7,366,995 B2 | 4/2008 | Montague |
| 2006/0168533 A1 | 7/2006 | Yip et al. |
| 2007/0252832 A1 | 11/2007 | Ratai |
| 2008/0001924 A1 | 1/2008 | de los Reyes et al. |

FOREIGN PATENT DOCUMENTS

JP 2007-156991 6/2007

*Primary Examiner*—Regina Liang
(74) *Attorney, Agent, or Firm*—Wenderoth, Lind & Ponack, L.L.P.

(57) ABSTRACT

Using a video conferencing system including first and second 2-dimensional display screens to implement a virtual surface between participants interacting with the 2-dimensional display screens. The virtual surface is utilized as a 3-dimensional rocker for pivoting an image displayed thereon in a 3-dimensional manner. The display screens (i.e., the virtual surface) may include a plurality of predefined/adjustable edge portions, such that each edge portion is designated as a rocker edge portion. Further, each rocker edge portion can be designated as at least one of a pivot portion and a panel portion. If a rocker edge portion that is a panel portion is utilized, then hidden information/options will appear. In addition, if a rocker edge portion that is a pivot portion is utilized, then the image displayed on the virtual surface will be pivoted around an invisible axis causing a portion of the image (which was once not visible) to appear.

1 Claim, 3 Drawing Sheets

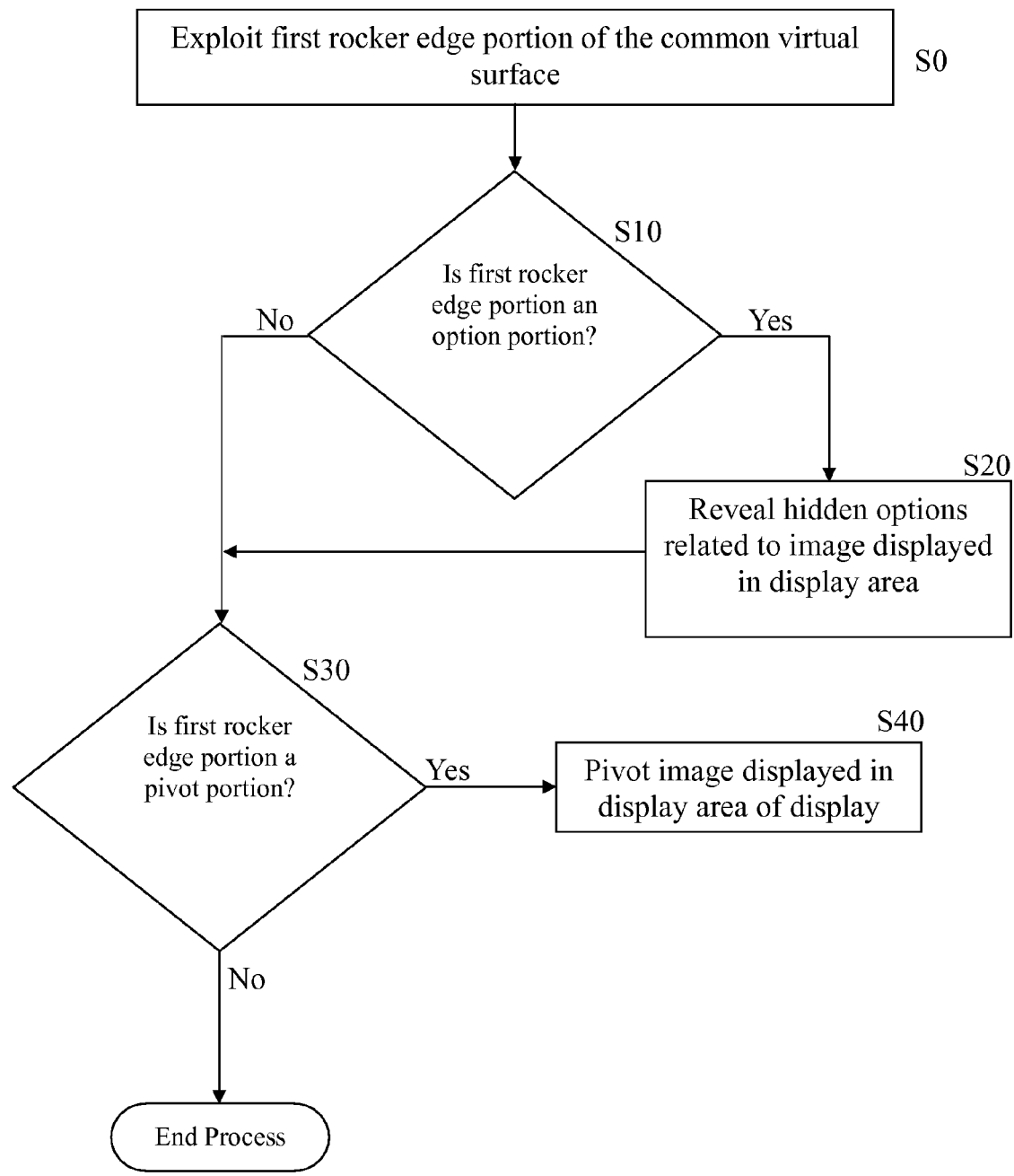

METHOD OF USING A VIDEO CONFERENCING SYSTEM INCLUDING AT LEAST TWO 2-DIMENSIONAL DISPLAY SCREENS TO IMPLEMENT A COMMON VIRTUAL SURFACE

BACKGROUND OF THE INVENTION

1. Field of the Invention

The present invention relates to using a video conferencing system including at least two 2-dimensional display screens to implement a common virtual surface. More specifically the present invention relates to utilizing the virtual common surface formed from the at least two 2-dimensional display screens as a 3-dimensional multi-way rocker for pivoting an image displayed thereon and for revealing a hidden panel in relation to the image displayed thereon.

2. Description of the Related Art

In the past, certain portions of a display screen that are utilized by a single participant of a video conferencing system have been designated as portions which (i) provide, only on the display screen of the single participant, new functionality in relation to an image displayed on the screen of the single participant or (ii) provide a new image (e.g., a new window) to appear only on the display screen of the single participant when the participant, interacts with certain portions of the display screen.

However, this above-described functionality (i) still utilizes the display screen of the single participant as a 2-dimensional display screen, such that the new functionality or the new image displayed thereon appear as if they exist in a 2-dimensional plane and (ii) only provides adjustment of the image displayed on the display screen of the single participant (i.e., not the display screen of another participant using the video conferencing system).

In order to provide a 3-dimensional environment for image manipulation and extended functionality in a video conferencing system a method of using a video conferencing system including at least two 2-dimensional display screens to implement a common virtual surface, between participants interacting with the at least two 2-dimensional display screens, as a 3-dimensional multi-way rocker for (i) pivoting an image displayed on the common virtual surface in a 3-dimensional manner and (ii) revealing a hidden panel in relation to the image displayed on the common virtual surface, is described below.

SUMMARY OF THE INVENTION

In view of the above, an embodiment of this invention provides a method of using a video conferencing system including at least two 2-dimensional display screens to implement a common virtual surface between participants interacting with the at least two 2-dimensional display screens, the common virtual surface being formed from the at least two 2-dimensional display screens and being utilized as a 3-dimensional multi-way rocker for pivoting an image displayed on the common virtual surface in a 3-dimensional manner and revealing a hidden panel in relation to the image displayed on the common virtual surface.

An embodiment of this invention may include a common virtual surface having a plurality of invisible or visible pre-defined and adjustable edge portions, each edge portion being designated as a respective rocker edge portion, and each respective rocker edge portion being designated as at least one of a pivot portion and a panel portion.

Further, an embodiment of this invention may include exploiting a first rocker edge portion of the common virtual surface from a first 2-dimensional display screen at a location of a first participant and revealing a hidden panel in relation to an image displayed on the common virtual surface that is formed from (i) the first 2-dimensional display screen at the location of the first participant and (ii) a second 2-dimensional display screen at a location of a second participant. This revealing may take place only if the first rocker edge portion is designated as a panel portion.

In addition, an embodiment of this invention may include exploiting the first rocker edge portion of the common virtual surface and pivoting the image displayed on the common virtual surface that is formed from (i) the first 2-dimensional display screen at the location of the first participant and (ii) the second 2-dimensional display screen at the location of the second participant. This pivoting may occur in response to the exploiting of the first rocker edge portion and may occur in a manner such that the image displayed on the common virtual surface is pivoted in a 3-dimensional manner based on a location of the first rocker edge portion with respect to the common virtual surface. This pivoting may occur only if the first rocker edge portion is designated as a pivot portion.

Moreover, according to an embodiment of this invention, when the pivoting of the image displayed on the common virtual surface occurs, the image displayed on the common virtual surface is pivoted such that: (i) a new portion of the displayed image or a new portion associated with the displayed image appears on the first and second 2-dimensional display screens; (ii) the new portion of the displayed image or associated with the displayed image appears on the first and second 2-dimensional display screens in a manner that provides an appearance that the new portion pivots from a third dimension and into a 2-dimensional plane formed by each 2-dimensional display screen; and (iii) a previously visible portion of the image pivots in relation to the appearance of the new portion of the displayed image or associated with the displayed image.

Also, when the image displayed on each 2-dimensional display screen is pivoted, an axis, around which the image displayed on the respective 2-dimensional display screens rotates, extends in a direction relative to the location of the first rocker edge portion such that the new portion of the displayed image or associated with the displayed image is closer to the first rocker edge portion than the previously visible portion of the image.

Additionally, according to an embodiment of this invention, a location of the revealed hidden panel is reciprocal to the first participant and the second participant, such that the location of the revealed hidden panel appears on the common virtual surface relative to a point of view of the first participant and relative to a point of view of the second participant. Further, a direction of the pivoting of the image displayed on the common virtual surface is reciprocal to the first participant and the second participant, such that the direction of the pivoting is relative to a point of view of the first participant and relative to a point of view of the second participant.

Furthermore, additional embodiments of the present invention can be directed to a computer system, or an entertainment system. In addition, the present invention can also be implemented as a program causing a computer to execute the above-described steps. The program can be distributed via a computer-readable storage medium such as a CD-ROM.

Additional features and advantages are described herein, and will be apparent from, the following Detailed Description and the figures.

BRIEF DESCRIPTION OF THE FIGURES

FIG. 3 is a flow chart illustrating steps included in an embodiment of the invention.

DETAILED DESCRIPTION OF THE INVENTION

The following detailed description refers to the accompanying drawings. Although the description includes exemplary implementations, other implementations are possible and changes may be made to the implementations described without departing from the spirit and scope of the invention. The following detailed description and the accompanying drawings do not limit the invention.

Figure 1A:
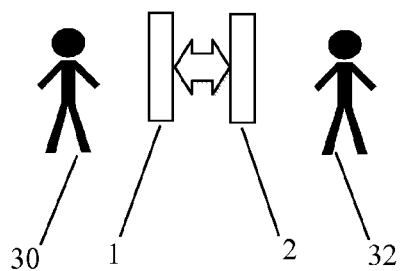
FIG. 1(a) illustrates a first participant viewing an image displayed on a first 2-dimensional display screen according to an embodiment of the invention.
Figure 1B:
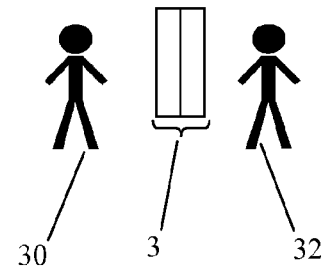
FIG. 1(b) illustrates a second participant viewing an image displayed on a second 2-dimensional display screen according to an embodiment of the invention.
Figure 1C:
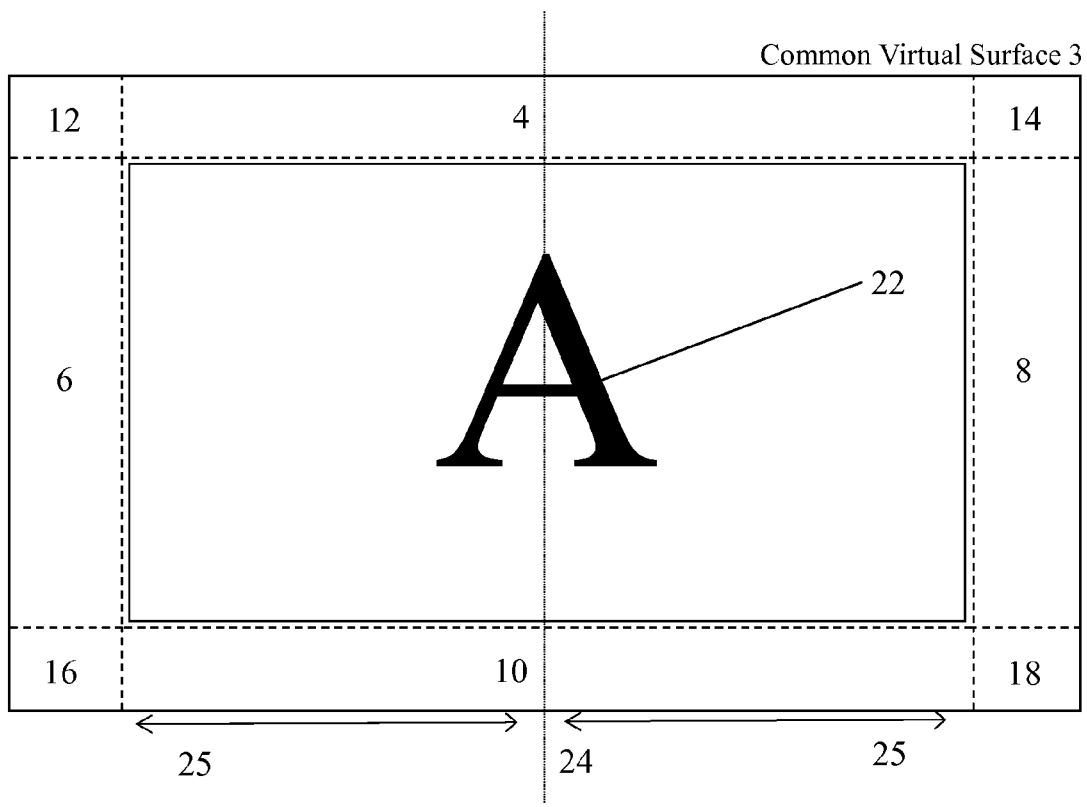
FIG. 1(c) illustrates an image displayed on a common virtual surface, as visible from the viewpoint of the first and second participants.
Figure 2:
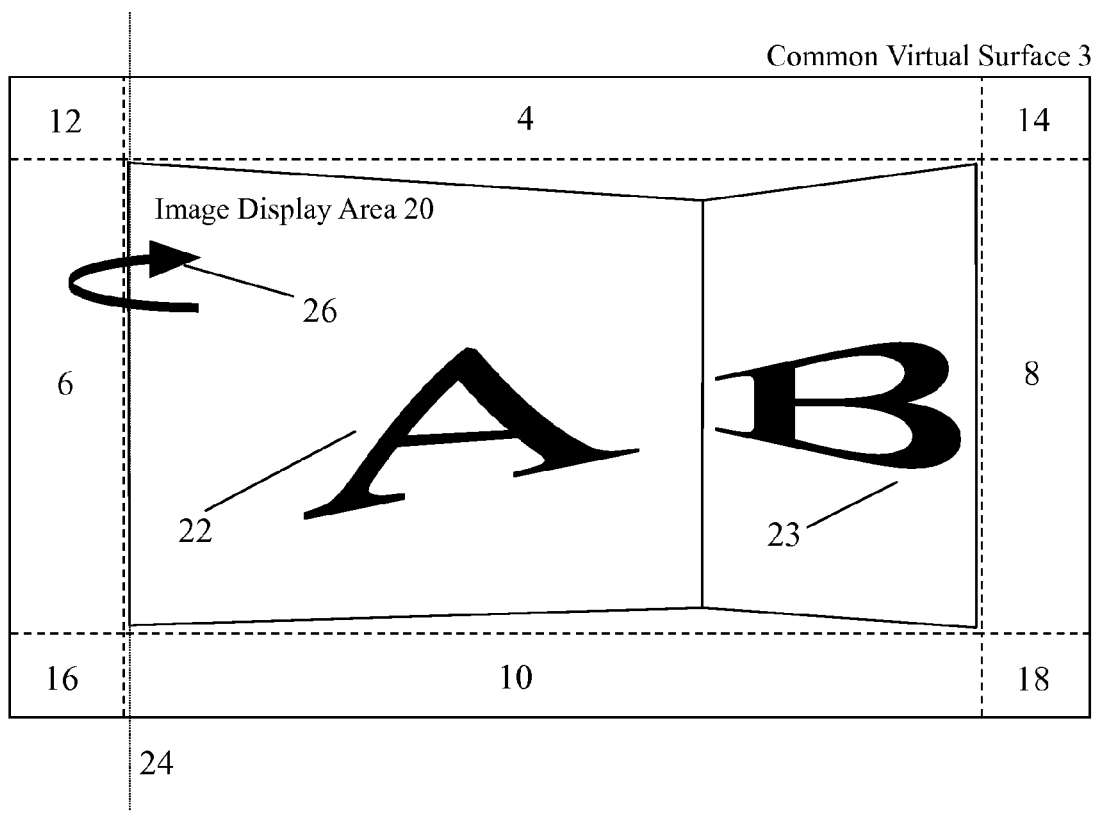
FIG. 2 illustrates an image pivoting in a 3-dimensional manner on the common virtual surface according to an embodiment of the invention.

As illustrated in FIGS. 1-3, an embodiment of this invention includes using a video conferencing system (not illustrated) including at least a first 2-dimensional display screen 1 and a second 2-dimensional display screen 2 to implement a common virtual surface 3 between participants 30, 32 interacting with the first and second 2-dimensional display screens 1, 2, respectively. The common virtual surface 3 is a representation of a common screen viewed by both participants 30, 32 on the first and second display screens 1, 2, respectively.

The common virtual surface 3 may be utilized as a 3-dimensional multi-way rocker for pivoting an image 22 displayed on an image display area 20 of the common virtual surface 3 (formed from the first and second 2-dimensional display screens 1, 2) in a 3-dimensional manner. The common virtual surface 3 (formed from the first and second 2-dimensional display screens 1, 2) includes a plurality of (visible or invisible) predefined and adjustable edge portions (4, 6, 8, 10, 12, 14, 16 and 18). Edge portions 12, 14, 16 and 18 are corner portions and edge portions 4, 6, 8 and 10 are non-corner portions.

Each edge portion (4, 6, 8, 10, 12, 14, 16 and 18) can be designated as a respective rocker edge portion (e.g., edge portion 8 can be designated as a first rocker edge portion, etc.). Further, each respective rocker edge portion may be designated as at least one of a pivot portion and a panel portion.

Using the video conferencing system may include exploiting the first rocker edge portion (e.g., edge portion 8) of the common virtual surface 3 (formed from the first and second 2-dimensional display screens 1, 2) (S0).

Next, a hidden panel (not illustrated) may be revealed. This hidden panel can be a panel related to the image 22 displayed on the common virtual surface 3 (formed from the first and second 2-dimensional display screens 1, 2) in response to the exploiting of the first rocker edge portion (e.g., edge portion 8). Once revealed, the hidden panel may include, for example, information and/or options related to the image 22 displayed on the common virtual surface 3. The hidden panel will only be revealed if the first rocker edge portion (e.g., edge portion 8) is designated as a panel portion (Yes at S10, and S20).

The hidden panel may be revealed in a reciprocal manner on the common virtual surface (e.g., reciprocal to participant 30 and participant 32), such that the location of the reveal hidden panel appears on the common virtual surface relative to a point of view of participant 30 and relative to a point of view of participant 32. For example, the hidden panel appears on a left side of the common virtual surface, as viewed by participant 30, and rather than being viewed on the right side of the common virtual surface, as viewed by participant 32, the hidden panel will also appear on the left side of the common virtual surface, as viewed by participant 32. Moreover, the hidden panel may also be revealed such that the hidden panel does not appear on the common virtual surface in a reciprocal manner.

In addition, the using of the video conferencing system may include, in response to the exploiting of the first rocker edge portion (e.g., edge portion 8), pivoting the image 22 displayed in the image display area 20 of the common virtual surface 3 that is formed from (i) the first 2-dimensional display screen 1 at the location of the first participant 30 and (ii) the second 2-dimensional display screen 2 at the location of the second participant 32, such that the image 22 displayed on the common virtual surface 3 is pivoted in a 3-dimensional manner based on a location of the first rocker edge portion (e.g., edge portion 8) with respect to the common virtual surface 3 and, optionally, based on a location of the image 22 on the common virtual surface 3. The pivoting may only occur if the first rocker edge portion (e.g., edge portion 8) is designated at a pivot portion (Yes at S30, and S40).

Additionally, in one embodiment, the image 22 may include the entire image displayed on the common virtual surface 3 (e.g., treating an image displayed on an entire display area of the common virtual surface 3 as the image 22 or treating the entire image display area 20 as the image 22). In another embodiment, the image 22 may only include an image that is displayed on a portion of the common virtual surface 3 (e.g., a portion of the common virtual surface 3 that is less than the entire display area).

When the pivoting of the image 22 displayed on the common virtual surface 3 occurs, the image 22 displayed on the common virtual surface 3 is pivoted such that (i) a new portion 23 of the displayed image 22 or a new portion 23 associated with the displayed image 22 appears on the first and second 2-dimensional display screens 1, 2 (i.e., the common virtual surface 3) and is displayed on a location of the first and second 2-dimensional display screens 1, 2 (i.e., the common virtual surface 3), (ii) the new portion 23 of the displayed image 22 or associated with the displayed image 22 appears on the first and second 2-dimensional display screens 1, 2 in a manner that provides an appearance that the new portion 23 pivots from a third dimension and into a 2-dimensional plane formed by each 2-dimensional display screen 1, 2 (i.e., the common virtual surface 3), and (iii) a previously visible portion of the image 22 pivots in relation to the appearance of the new portion 23.

Additionally, the previously visible portion of the image may begin to disappear from a display location of the common virtual surface 3 in a manner that provides an appearance that the previously visible portion of the image 22 pivots from the 2-dimensional plane formed by the common virtual surface 3 and into the third dimension (not illustrated).

In addition, when the image 22 displayed on the each 2-dimensional display screen 1, 2 is pivoted, for example, an invisible axis 24 around which the image 22 displayed on each 2-dimensional display screen 1, 2 extends in a direction relative to the location of the first rocker edge portion (e.g., edge portion 8) such that the new portion 23 of the image 22 or associated with the image 22 is closer to the first rocker edge portion (e.g., edge portion 8) than the previously visible portion of the image 22 (that, for example pivots in relation to the appearance of the new portion 23 or begins to disappear from the common virtual surface). Alternatively, the previously visible portion of the image 22 (that, for example pivots in relation to the appearance of the new portion 23 or begins to disappear from the common virtual surface 3) may be closer to the first rocker edge portion (e.g., edge portion 8) than the new portion 23 that appears on each 2-dimensional display screen 1, 2 (i.e., the common virtual surface 3), as if the pivoting occurs in an opposite direction than as described above.

As illustrated in FIG. 2, the previously visible portion of the image 22 is pivoting in relation to the appearance of the new portion 23 and the new portion 23 is appearing in the image display area 20 of the common virtual surface 3. This feature provides the appearance that, since the first rocker edge portion (e.g., edge portion 8) is exploited the images 22 and 23 will rotate around the invisible axis 24 in a direction of the arrow 26 as if a left-most portion of the image 22 is pivoting at axis 24 and as if image 22 were being pressed to bring the new portion 23 into view from the third dimension.

Additionally, the location of the axis 24 may be adjusted in the direction of arrows 25 (FIG. 1), such that, as illustrated in FIG. 2, axis 24 is located near the left-most portion of the image display area 20. Further, depending upon the location of the axis 24, another new image (not illustrated) may appear in the left-most portion of the image display area 20 (e.g., if axis 24 were to be located in the center of the image display area 20, it may be appropriate for the other new image (not illustrated) to appear as if it were being pulled out of the common virtual surface 3).

Moreover, a direction of the pivoting of the image 22 displayed on the common virtual surface is reciprocal (e.g., reciprocal to participant 30 and participant 32), such that the direction of pivoting is relative to a point of view of the first participant 30 and relative to a point of view of the second participant 32. For example, the direction of the pivoting appears to be in a rightward direction, as viewed by both participant 30 and participant 32, rather than being in a leftward direction as viewed by participant 32 and a rightward direction as viewed by participant 30. Moreover, the direction of pivoting may occur such that the direction does not appear on the common virtual surface in a reciprocal manner.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claim.

The invention claimed is:

1. A method of using a video conferencing system including at least two 2-dimensional display screens to implement a common virtual surface between participants interacting with the at least two 2-dimensional display screens, the common virtual surface being formed from the at least two 2-dimensional display screens and being utilized as a 3-dimensional multi-way rocker for pivoting an image displayed on the common virtual surface in a 3-dimensional manner, the common virtual surface having a plurality of predefined and adjustable edge portions, each edge portion being designated as a respective rocker edge portion, and each respective rocker edge portion being designated as at least one of a pivot portion and a panel portion, the method of using the video conferencing system comprising:

exploiting a first rocker edge portion of the common virtual surface from a first 2-dimensional display screen at a location of a first participant;

revealing a hidden panel in relation to the image displayed on the common virtual surface that is formed from (i) the first 2-dimensional display screen at the location of the first participant and (ii) a second 2-dimensional display screen at a location of a second participant, in response to said exploiting of the first rocker edge portion, said revealing only occurring if the first rocker edge portion is designated as a panel portion; and pivoting the image displayed on the common virtual surface that is formed from (i) the first 2-dimensional display screen at the location of the first participant and (ii) the second 2-dimensional display screen at the location of the second participant, in response to said exploiting of the first rocker edge portion, such that the image displayed on the common virtual surface is pivoted in a 3-dimensional manner based on a location of the first rocker edge portion with respect to the common virtual surface, said pivoting occurring only if the first rocker edge portion is designated as a pivot portion, wherein, when said pivoting of the image displayed on the common virtual surface occurs, the image displayed on the common virtual surface is pivoted such that (i) a new portion of the displayed image or a new portion associated with the displayed image appears on the first and second 2-dimensional display screens, (ii) the new portion of the displayed image or associated with the displayed image appears on the first and second 2-dimensional display screens in a manner that provides an appearance that the new portion pivots from a third dimension and into a 2-dimensional plane formed by each 2-dimensional display screen, and (iii) a previously visible portion of the image pivots in relation to the appearance of the new portion of the displayed image or associated with the displayed image, wherein, when the image displayed on each 2-dimensional display screen is pivoted, an axis, around which the image displayed on the respective 2-dimensional display screens rotates, extends in a direction relative to the location of the first rocker edge portion such that the new portion of the displayed image or associated with the displayed image is closer to the first rocker edge portion than the previously visible portion of the image, wherein a location of the revealed hidden panel is reciprocal to the first participant and the second participant, such that the location of the revealed hidden panel appears on the common virtual surface relative to a point of view of the first participant and relative to a point of view of the second participant, and wherein a direction of said pivoting of the image displayed on the common virtual surface is reciprocal to the first participant and the second participant, such that the direction of said pivoting is relative to a point of view of the first participant and relative to a point of view of the second participant.

* * * * *